(12) United States Patent
Polido et al.

(10) Patent No.: US 11,084,175 B2
(45) Date of Patent: Aug. 10, 2021

(54) END-OF-ARM TOOL HAVING CONCENTRIC SUCTION CUPS, AND RELATED SYSTEMS AND METHODS

(71) Applicant: Amazon Technologies, Inc., Seattle, WA (US)

(72) Inventors: Felipe De Arruda Camargo Polido, North Reading, MA (US); Ulf Hartmann, Vaermland (SE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/219,543

(22) Filed: Dec. 13, 2018

(65) Prior Publication Data

US 2020/0189122 A1 Jun. 18, 2020

(51) Int. Cl.
*B25J 15/06* (2006.01)
*B25B 11/00* (2006.01)
*B65G 47/91* (2006.01)

(52) U.S. Cl.
CPC ......... *B25J 15/0625* (2013.01); *B25B 11/005* (2013.01); *B25J 15/0683* (2013.01); *B65G 47/91* (2013.01)

(58) Field of Classification Search
CPC .... B25J 15/641; B25J 13/086; B25J 15/0625; B25J 15/0683; H05K 3/30; H05K 13/0069; B65G 47/91; B25B 11/005
USPC .................................................. 294/183, 185
See application file for complete search history.

(56) References Cited

U.S. PATENT DOCUMENTS

| | | | |
|---|---|---|---|
| 3,834,558 A * | 9/1974 | Bru | B66C 1/0212 414/627 |
| 3,973,682 A * | 8/1976 | Neff | H01L 21/6838 414/627 |
| 4,559,718 A | 12/1985 | Tadokoro | |
| 4,728,135 A | 3/1988 | Sugimura et al. | |
| 4,815,779 A * | 3/1989 | Glessner | B25J 15/0616 29/743 |
| 4,852,247 A | 8/1989 | Hawkswell | |

(Continued)

FOREIGN PATENT DOCUMENTS

| | | |
|---|---|---|
| GB | 1193921 A | 6/1970 |
| JP | S63-129698 A | 6/1988 |

(Continued)

OTHER PUBLICATIONS

International Patent Application No. PCT/US2019/066078; Int'l Search Report and the Written Opinion; dated Apr. 23, 2020; 31 pages.

*Primary Examiner* — Paul T Chin
(74) *Attorney, Agent, or Firm* — BakerHostetler

(57) ABSTRACT

An end-of-arm tool for attachment to a robotic arm, includes a housing, an outer suction cup assembly that includes an outer suction cup located at the distal end of the housing, and an inner suction cup assembly that extends centrally through the outer suction cup assembly. The inner suction cup assembly includes a lower suction tube, an inner suction cup that is positioned at a distal end of the lower suction tube and is in fluid communication with the lower suction tube. The inner suction cup is concentrically located relative to the outer suction cup. The tool includes an actuator configured to selectively extend and retract the lower suction tube with respect to the outer suction cup.

18 Claims, 7 Drawing Sheets

(56) References Cited

U.S. PATENT DOCUMENTS

| | | | | |
|---|---|---|---|---|
| 4,950,011 | A * | 8/1990 | Borcea | H05K 13/0413 |
| | | | | 294/2 |
| 4,995,662 | A * | 2/1991 | Hawkswell | B65G 47/91 |
| | | | | 294/188 |
| 5,193,776 | A | 3/1993 | Nagai et al. | |
| 5,207,465 | A * | 5/1993 | Rich | B65G 47/917 |
| | | | | 294/2 |
| 5,317,803 | A * | 6/1994 | Spigarelli | H05K 13/0465 |
| | | | | 29/840 |
| 5,374,158 | A * | 12/1994 | Tessier | G01R 31/2851 |
| | | | | 414/759 |
| 5,542,726 | A | 8/1996 | Ozawa | |
| 5,572,785 | A * | 11/1996 | Tveit | G02B 7/02 |
| | | | | 29/283 |
| 6,000,122 | A | 12/1999 | Uchida et al. | |
| 7,677,622 | B2 * | 3/2010 | Dunkmann | B65G 47/917 |
| | | | | 294/188 |
| 8,096,598 | B2 * | 1/2012 | Perlman | B25B 11/007 |
| | | | | 294/64.2 |
| 8,267,449 | B2 * | 9/2012 | Maffeis | B65G 47/91 |
| | | | | 294/183 |
| 9,415,520 | B2 * | 8/2016 | Sanders | B25J 15/0616 |
| 2013/0108409 | A1 * | 5/2013 | Wu | B25J 15/0616 |
| | | | | 414/800 |
| 2019/0160691 | A1 * | 5/2019 | O'Connor | B25J 15/0061 |

FOREIGN PATENT DOCUMENTS

| | | |
|---|---|---|
| JP | H03-142187 A | 6/1991 |
| JP | H07-251374 A | 10/1995 |

* cited by examiner

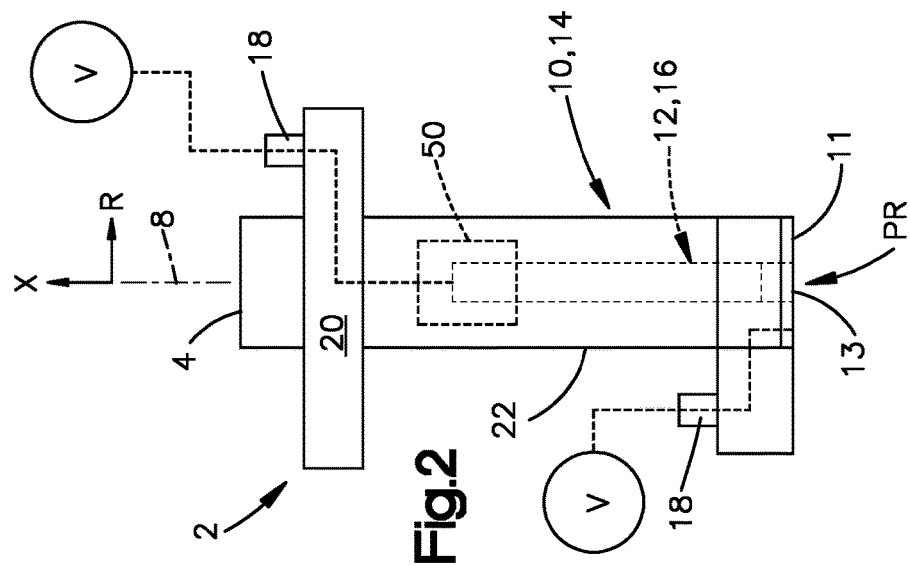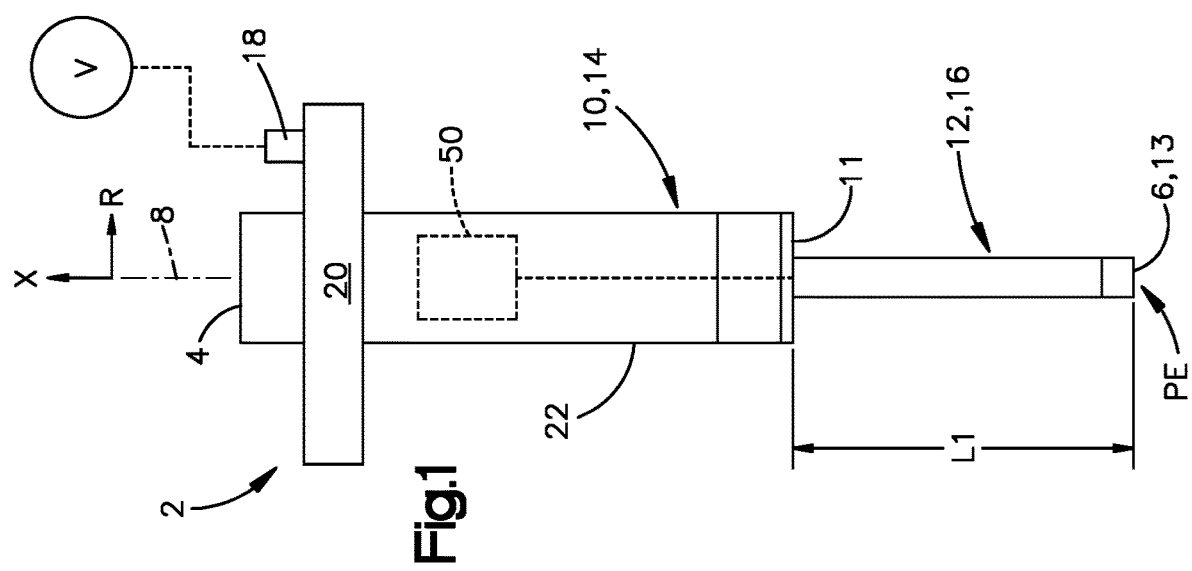

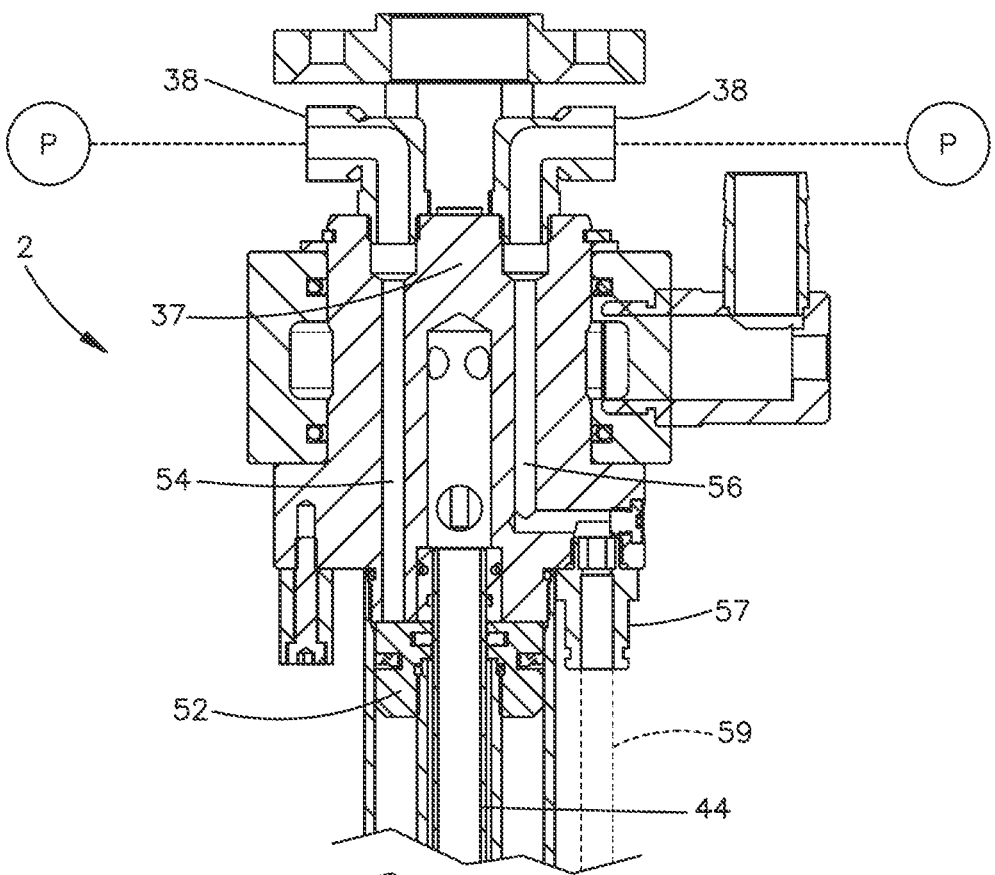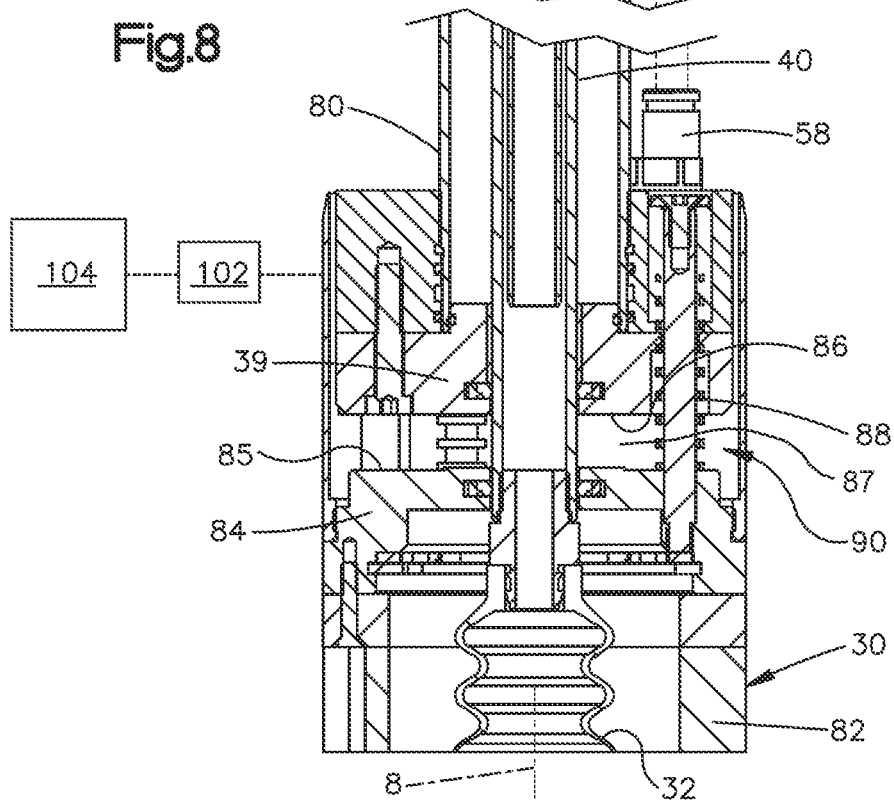
Fig.8

END-OF-ARM TOOL HAVING CONCENTRIC SUCTION CUPS, AND RELATED SYSTEMS AND METHODS

BACKGROUND

The present invention relates to automation, and more particularly to tools for engaging and lifting items via vacuum suction cups.

The robotics field has developed many tools for engaging and lifting (i.e., "picking") items at the end of an end effector. For example, end effectors sometimes employ suction cups for engaging a surface of an item and using a negative or suction pressure or vacuum to engage and lift the item.

End-of-arm-tools (i.e., tools that are carried on the end of a robotic arm) that employ one or more suction cups have some limitations, as the force created by the suction cup is limited by the magnitude of the negative pressure and suction cup area. In an environment in which many items of different shapes and sizes are expected to be encountered, a large suction cup may be blocked from the desired item by other items or the container in which the items may be located, or the item may be too small to engage the entire circumference of the suction cup. And a small suction cup may not be able to generate the force required to lift a heavier item. Some prior art suction cup lifting tools address these problems by providing a large tool body with multiple banks of suction cups, wherein each bank is adapted, such as by the size of its suction cup(s) and the amount of negative pressure, to grip a surface area within a predetermined size range. However, such tools are large and bulky, as they require a single tool to house the various suction cup banks, only one of which is used at any one time to grip an item.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 1 shows a plan elevation view of an end-of-arm tool in a fully extended configuration, according to an embodiment of the present disclosure;

FIG. 2 shows a plan elevation view of the end-of-arm tool illustrated in FIG. 1 in a fully retracted configuration, according to an embodiment of the present disclosure;

FIG. 8 shows a partial sectional side view of the end-of-arm tool, taken along section line 8-8 illustrated in FIG. 5, in a fully retracted position.

DETAILED DESCRIPTION

Figure 3:
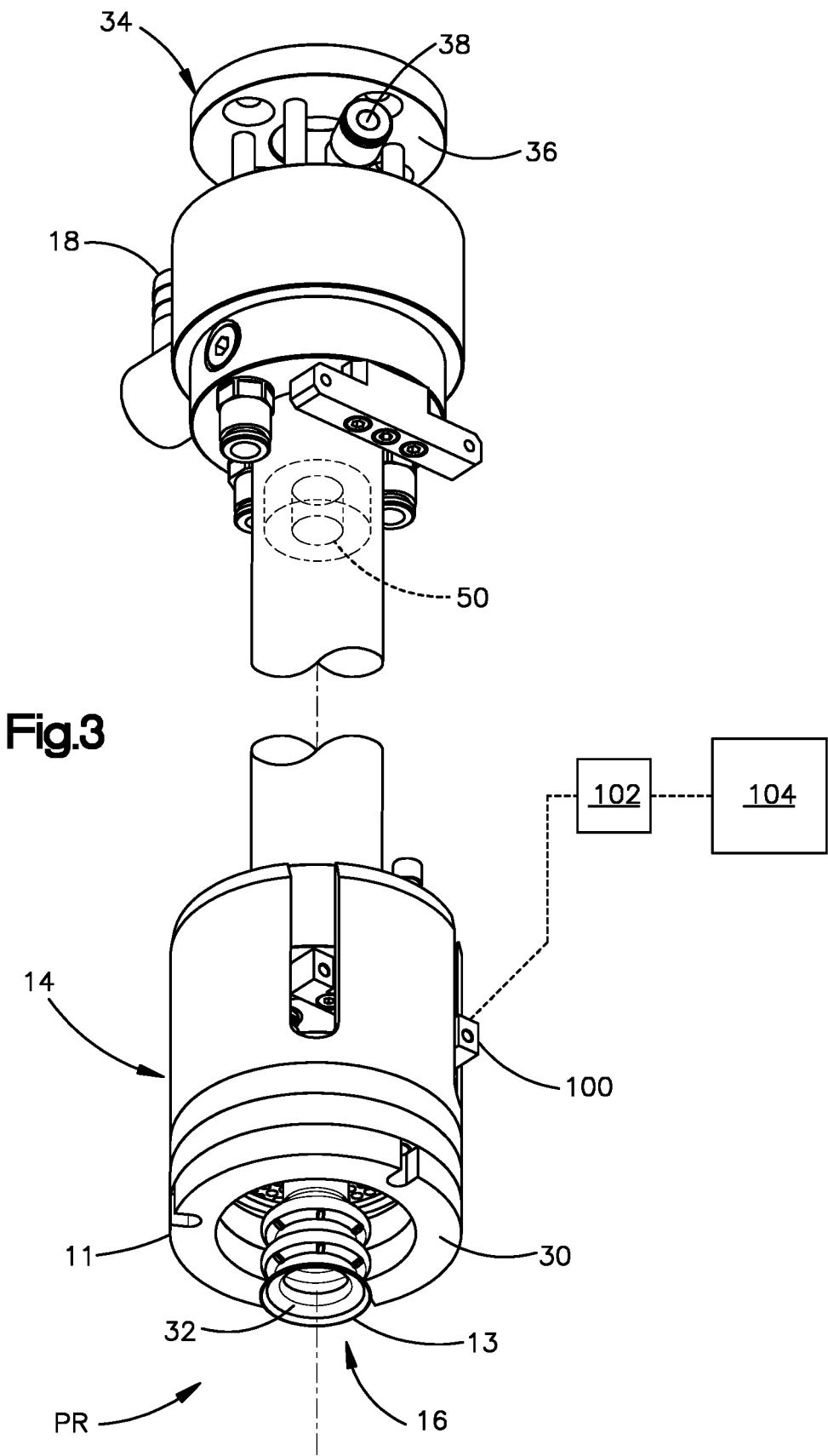
FIG. 3 shows a perspective view of an end-of-arm tool according to an exemplary embodiment of the present disclosure, illustrating the tool in a fully contracted configuration.
Figure 4:
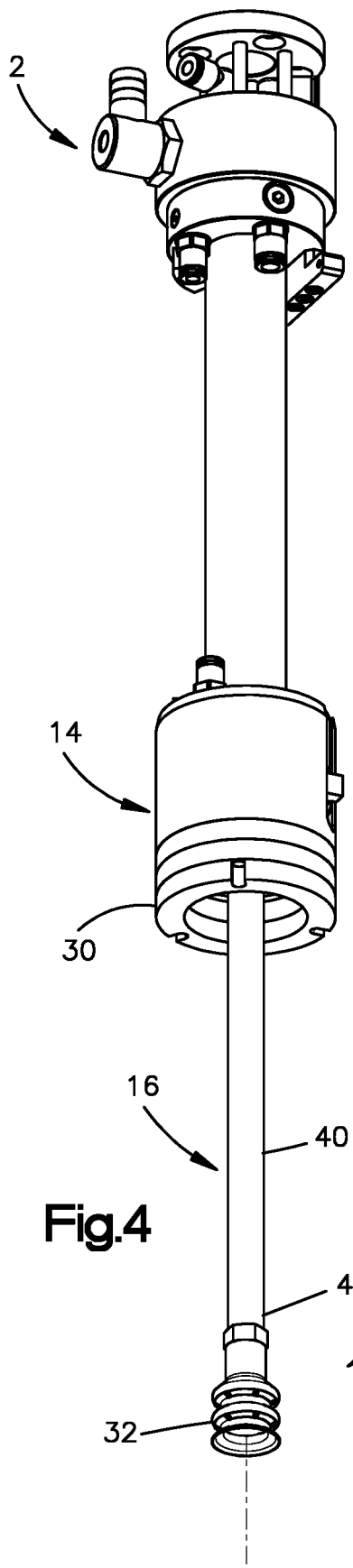
FIG. 4 shows a perspective view of the end-of-arm tool illustrated in FIG. 3 in a fully extended configuration.
Figure 5:
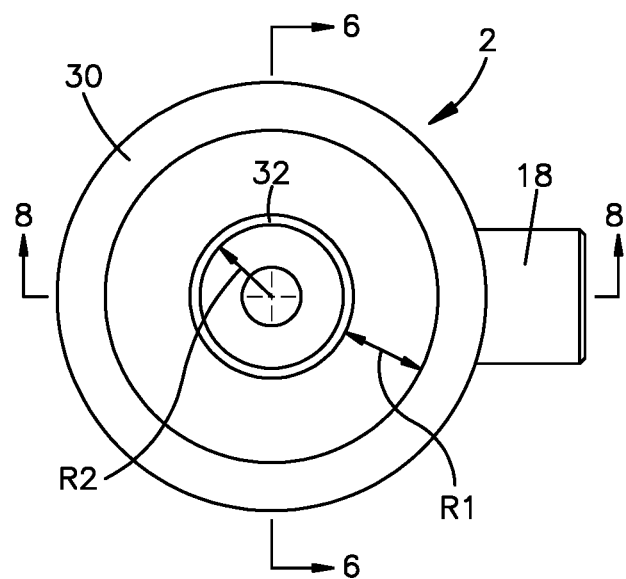
FIG. 5 shows a bottom view of the end-of-arm tool illustrated in FIG. 3.

The embodiments of the present disclosure pertain to end-of-arm tools that carry an outer suction cup and an inner suction cup that is selectively extendable and retractable relative to the outer suction cup while maintaining concentric alignment with the outer suction cup. This functionality allows a control system operating a robotic arm carrying the end-of-arm tool to target various items for picking using the inner suction cup or both suction cups at different stages of a pick as needed for effective and efficient picking of items. For example, the end-of-arm tool can engage lighter, smaller, and/or hard to reach items with the extendable inner suction cup, and then pull the item into engagement with the outer suction cup as needed. For larger, heavier, and/or easier to reach items, the end-of-arm tool can be brought into engagement with one of these items with the inner suction cup retracted so that both suction cups engage the item simultaneously, or the end-of-arm tool can alternatively engage such items with the inner suction cup extended, and the advance the outer suction cup with respect to the inner suction cup until both suction cups engage the item simultaneously. In this manner, the tool provides multiple options for picking items. This concentric alignment of the suction cups also provides the tool with a narrower profile, allowing the tools to operate more effectively in confined workspaces relative to prior art suction grippers.

Referring now to FIGS. 1 and 2, an end-of-arm tool 2 of the present disclosure has a proximal end 4 and a distal end 6 spaced from each other along a first or axial direction X. The tool 2 further defines a central axis 8 oriented along the axial direction X. The distal end 6 of the tool 2 is configured for gripping various items, particularly via suction. The tool 2 includes a first or primary gripping mechanism 10 and a second or secondary gripping mechanism 12 that is extensible and retractable, such as between a fully extended position PE (FIG. 1) and a fully retracted position PR (FIG. 2), relative to the primary gripping mechanism 4, along the axial direction X. In the fully extended position PE, a distal gripping end 13 of the secondary gripping mechanism 12 can be spaced from a distal gripping end 11 of the primary gripping mechanism 10 at an extension length L1 measured along the axial direction X. The tool 2 includes an actuator 50 configured to drive the extension and retraction of the secondary gripping mechanism 12 relative to the primary gripping mechanism 10, as described in more detail below.

The primary gripping mechanism 10 includes an outer suction assembly 14 and is configured to provide a first gripping force, particularly a first vacuum gripping force, to a target surface or area of an item selected for gripping. The secondary gripping mechanism 12 includes the inner suction assembly 16 and is configured to provide a second gripping force, particularly a second vacuum gripping force, to the target surface or area. In preferred embodiments, the first vacuum gripping force is greater than the second vacuum gripping force. Thus, in such embodiments, the primary gripping mechanism 10 can be characterized as being configured for gripping "heavier" items, while the secondary gripping mechanism 12 can be characterized as being configured for gripping "lighter" items. The distal gripping ends 11, 13 of the outer and inner suction assemblies 14, 16 are each configured to be axially compliant independent of the extension and retraction of the secondary gripping mechanism 12. Such axial compliance provides a degree of axial tolerance for targeting and gripping items. For example, if the system overestimates the distance between the distal end 6 of the tool 2 and the target surface of the item during a pick, the inner suction cup 32 (and the outer suction cup 30 if the tool 2 is picking the item with the inner suction assembly 16 retracted) are configured to comply proximally in the axial direction X with respect to the remainder of the tool 2, up to an extent of compliance, upon engaging the target surface instead of attempting to advance through the item to the location at which the system estimated the target surface to be. Additionally, the compliance allows the system to intentionally "over-shoot" the target surface by a small distance, which can provide enhanced engagement between the item and the inner suction cup 32 (and/or outer suction cup 30 if the inner suction assembly 16 is retracted) and prevent the tool 2 from failing to advance fully into engagement with the item (i.e., "come up short") during a pick. The mechanisms that provide the compliance to the outer and inner suction cups 30, 32 are described in more detail below.

As shown in FIG. 2, the secondary gripping mechanism 12 can reside entirely, or at least substantially entirely, within the primary gripping mechanism 10 in the fully retracted position PR. Preferably, in the fully retracted position PR, the distal gripping end 11 of the primary gripping mechanism 10 is positioned "flush" with the distal gripping end 13 of the secondary gripping mechanism 12. In this manner, the first and second vacuum gripping forces can be applied concurrently to the target surface or area of the item when in the fully retracted position PR, increasing the total vacuum gripping force on the item (which can be up to the sum of the first and second vacuum gripping forces), while also providing vacuum gripping redundancy (which can, among other things, reduce the likelihood of the item "peeling" away from the gripping ends 11, 13), and enhancing the gripping stability of the tool 2.

With continued reference to FIGS. 1 and 2, the tool 2 includes one or more external vacuum ports 18 that are connectable to one or more associated external vacuum sources V for supplying suction, such as vacuum pressure, to generate the first and second vacuum gripping forces to the outer and inner suction assemblies 14, 16. The tool 2 in FIG. 1 is connected to a single vacuum source V that supplies vacuum pressure to both of the outer and inner suction assemblies 14, 16, while the tool in FIG. 2 is connected to a pair of vacuum sources V, one of which supplies vacuum pressure to the outer suction assembly 14 while the other vacuum source V supplies vacuum pressure to the inner suction assembly 16. The one or more external vacuum ports 18 can optionally be defined by a vacuum coupling 20, which can be attached to a housing 22 of the tool 2. The vacuum coupling 20 is preferably located at or near the proximal end 4 of the tool 2. The vacuum coupling 20 is configured to communicate vacuum pressure to one or both of the outer and inner suction assemblies 14, 16. In embodiments where the vacuum coupling 20 is configured to communicate vacuum pressure to both the outer and inner suction assemblies 14, 16, the vacuum coupling 20 can be characterized as a "vacuum manifold" or simply a "manifold." In further embodiments, the vacuum coupling 20 can be configured to form a vacuum rotary joint with the housing 22, thereby allowing free rotation between the vacuum rotary joint and the housing substantially without diminishing the vacuum pressure communicated to the outer suction assembly 14 and/or the inner suction assembly 16.

The outer suction assembly 14 and the inner suction assembly 16 are concentrically aligned with each other, preferably with respect to the central axis 8. The concentricity of the outer and inner suction assemblies 14, 16 provides enhanced complimentary suction gripping and stability when the assemblies 14, 16 are concurrently engaged with a target surface or area, as described above. The concentricity also allows the tool 2 to have a narrower profile in a radial direction R perpendicular to the axial direction X, particularly relative to prior art suction gripping tools. This narrower profile allows the tool 2 to operate within a more confined workspace, such as within a bin or tote. The narrower profile also allows the tool 2 to undergo a greater range of polyaxial angulation within confined workspaces, so as to align the central axis 8 with target surfaces at various orientations within the workspace.

Referring now to FIGS. 3 through 8, an exemplary embodiment of the tool 2 is shown, which is generally constructed according to the principals described above. Accordingly, the same references numbers set forth above with be also used in reference to the present exemplary embodiment.

As shown in FIG. 3, the outer suction assembly 14 includes an outer suction cup 30 at its distal end 11, and the inner suction assembly 16 includes an inner suction cup 32 at its distal end 13. Accordingly, the outer suction assembly 14 can also be referred to an "outer suction cup assembly"; the inner suction assembly 16 can also be referred to an "inner suction cup assembly"; and the tool 2 can also be referred to as a "suction cup tool." Moreover, the outer and inner suction cups 30, 32 are also concentrically located relative to each other, as shown, for example, in FIG. 5. In this manner, the first vacuum gripping force is a function of a radial distance R1 between the outer diameter (OD) of the inner suction cup 32 and the inner diameter (ID) of the outer suction cup 30. Moreover, the second vacuum gripping force is a function of the radius R2 of the inner suction cup 32. The inner suction assembly 16 extends centrally through the outer suction assembly 14, as described in more detail below.

The proximal end 4 of the tool 2 includes a mounting bracket 34, which can include a plate 36 configured to be coupled to the end of a robot arm that is configured for manipulating the position and orientation of the tool 2, including via polyaxial manipulation, such as to align the central axis 8 with a target surface or area of an item to be gripped by the tool 2. The plate 36 can be spaced proximally from a proximal portion of the housing 22, such as a proximal housing block 37, in a manner providing a protected space in which one or more pneumatic couplers 38 can reside, which coupler(s) 38 are configured for providing pneumatic communication to the actuator 50. The tool 2 includes a cylinder 80, such as a pneumatic cylinder, for further providing pneumatic communication to the actuator 50.

The inner suction assembly 16 includes a lower suction tube 40 that has a distal end 42 that carries the inner suction cup 32. The inner suction cup 32 defines an interior geometry that is in fluid communication with the a central bore of the lower suction tube 40. The actuator 50 is operatively coupled to the lower suction tube 40 and is configured to selectively extend and retract the lower suction tube 40 between the fully retracted position PR and the fully extended position PE with respect to the outer suction assembly 14 (and thus also with respect to the outer suction cup 30), as described in more detail below.

Figure 6:
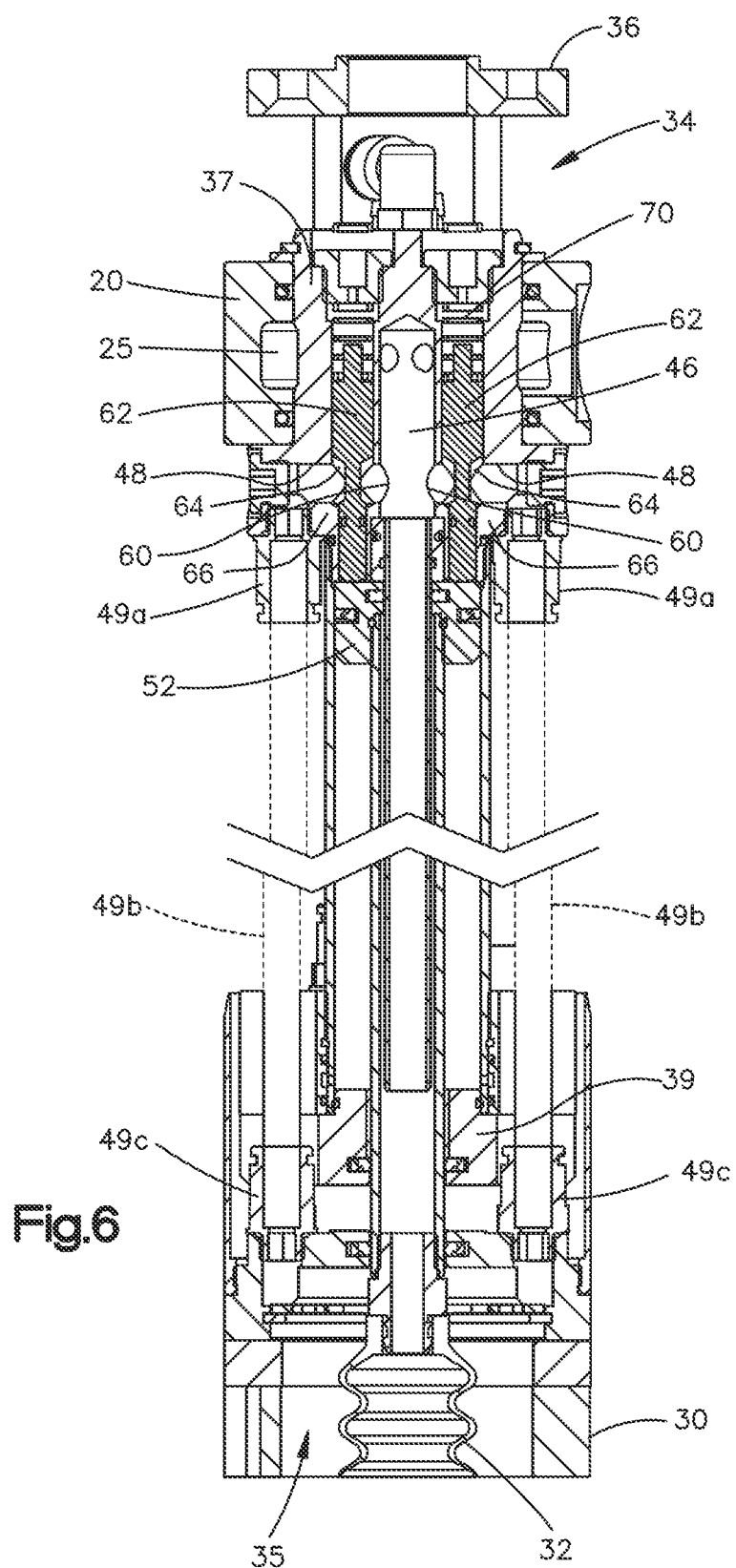
FIG. 6 shows a partial sectional side view of the end-of-arm tool, taken along section line 6-6 illustrated in FIG. 5, in a fully retracted position.
Figure 7:
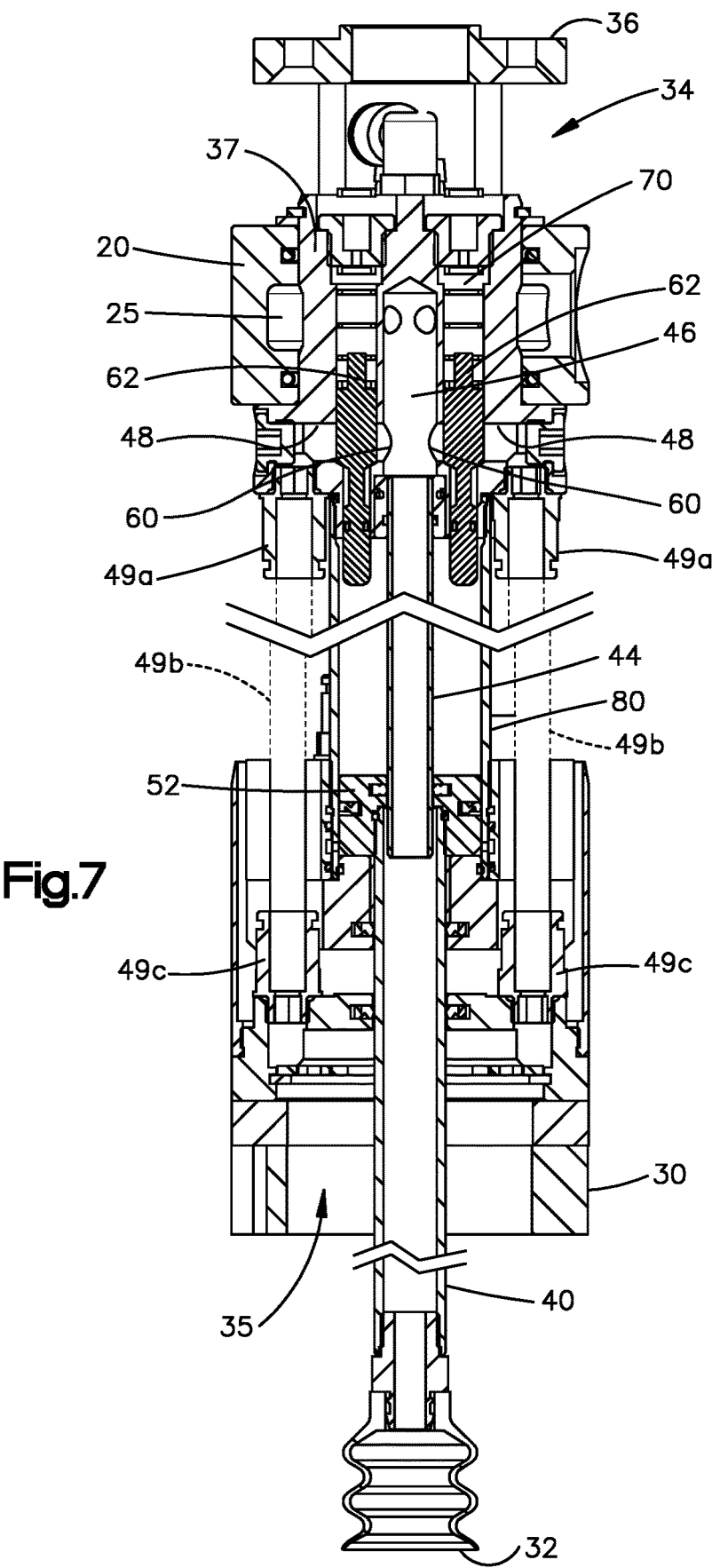
FIG. 7 shows a partial sectional side view of the end-of-arm tool, taken along section line 6-6 illustrated in FIG. 5, in a fully extended position.

Referring now to FIGS. 6 and 7, the inner suction cup assembly 16 includes an inner suction tube 44 operatively coupled to the lower suction tube 40, such that the lower suction tube 40 is configured to telescopically translate with respect to the inner suction tube 44 along the central axis 8. It is to be appreciated that because the lower suction tube 40 and the inner suction tube 44 are concentrically aligned, either or both of the tubes 40, 44 can define the central axis 8. The lower suction tube 40, and thus the inner suction cup 32, is in fluid communication with the inner suction tube 44, which is in turn in fluid communication with a central plenum 46 defined with the housing 22. The central plenum 46 is in fluid communication with and configured to transmit vacuum pressure from the external vacuum source via the vacuum coupling 20. In this manner, vacuum pressure is in turn communicated from the external vacuum source, through the vacuum coupling 20, through the central plenum 46, through the inner suction tube 44, through the lower suction tube 40, and to the inner suction cup 32. In this manner, the second vacuum gripping force is provided by the inner suction cup 32.

The tool 2 includes at least one outer plenum 48 configured to communicate vacuum pressure to the outer suction cup 30. In the present exemplary embodiment, the at least one outer plenum 48 is configured to be in selective fluid communication with the central plenum 46. For example, the at least one outer plenum 48 can define at least one inlet 60 in fluid communication with the central plenum 46, and the tool 2 includes at least one valve member 62 configured to move between an open position and a closed position. In such embodiments, the vacuum coupling 20 can be characterized as a "manifold" that communicates vacuum pressure from the external vacuum source to both of the outer and inner suction cups 30, 32. Preferably, the vacuum coupling 20 defines an internal annular space 25 that extends circumferentially around the housing, such that the manifold is rotationally coupled to the housing in a manner sealing the internal annular space so as to define a rotary vacuum joint. Such a rotary vacuum joint is advantageous because it can prevent external tubes or hoses, such as vacuum and/or pneumatic hoses extending from the tool 2 to the robot arm, from becoming entangled as the robot arm manipulated the tool 2.

As shown in FIG. 6, when the at least one valve member 62 is in the open position (particularly when the lower suction tube 40 is fully retracted), the at least one inlet 60 is open to the central plenum 46 and also to the at least one outer plenum 48. Thus, when the lower suction tube 40 is in the fully retracted position PR, vacuum pressure is communicated to concurrently to the outer and inner suction cups 30, 32. As shown in FIG. 7, when the at least one valve member 62 is in the closed position (particularly when the lower suction tube 40 is extended), the at least one valve member 63 occludes the inlet(s) 60, thereby inhibiting fluid communication between the central plenum 46 and the outer plenum(s) 48. Thus, when the lower suction tube 40 is extended, vacuum pressure is interrupted to the outer suction cup 30.

As shown, the at least one outer plenum 48 can be a pair of opposed outer plenums 48 that intersect the central plenum 46 at a T-junction. Moreover, the at least one inlet 60 can be a pair of inlets 60 at opposite sides of the T-junction. The outer plenums 48 extend to a pair of external fluid couplers 49a that are in turn connected via hoses 49b to a second pair of external fluid couplers 49c that extend from the outer suction cup 30. The second pair of external fluid couplers 49c are in fluid communication with an internal suction chamber 35 of the outer suction cup 30. The inlets 60 traverse a pair of valve channels 64 that define respective valve seats 66. The at least one valve member 62 can include a pair of valve members 62, each having a plug configured to engage the seat 66, and a stem that is coupled to a biasing member, such as a spring 70, that biases the plug against the seat 66. In this manner, the valve members 66 are biased into the closed position (FIG. 7), thus inhibiting fluid communication between the central plenum 46 and outer plenums 48 until the valve members are actuated into the open position.

The actuator 50 comprises a drive member, such as a piston head 52, that is configured to drive translation of the lower suction tube 40 with respect to the inner suction tube 44 responsive to one or more actuation forces transmitted to the drive element. In this manner, the one or more actuation forces can be employed to selectively extend and retract the lower suction tube 40 (and thus the inner suction cup 32) with respect to the outer suction cup 30 along the central axis 8. In the present exemplary embodiment, the actuation forces are also employed to actuate the valve members 62 into the open position and thus providing vacuum pressure to the outer suction cup 30, as described in more detail below. The piston head 52 is preferably rigidly coupled to the lower suction tube 40, such as at the proximal end thereof.

Referring now to FIG. 8, the actuator 50 further comprises at least one actuation channel, such as first and second pneumatic channels 54, 56, extending within the tool 2 and in pneumatic communication with the piston head 52. As shown, the pneumatic channels 54, 56 can each extend within the tool 2 from the pneumatic couplers 38 at the proximal end of the housing, for example. The pneumatic couplers 38 can be coupled with pneumatic hoses for connection with a single source of pneumatic fluid or multiple sources of pneumatic fluid, as desired. In the present embodiment, the first pneumatic channel 54 is configured to direct pneumatic fluid, such as compressed air or another gas, against the piston head 52 so as to apply a first, distal actuation force to the piston head 52, thereby driving the piston head distally along the central axis 8 so as to extend the lower suction tube 40 (and thus the inner suction cup 32) with respect to the outer suction cup 30. Additionally, the second pneumatic channel 56 is configured to direct pneumatic fluid against the piston head 52 so as to apply a second, proximal actuation force to the piston head 52, thereby driving the piston head proximally along the central axis 8 so as to retract the lower suction tube 40 (and thus the inner suction cup 32) with respect to the outer suction cup. The first pneumatic channel 54 can extend substantially directly, such as along a straight line, from the associated pneumatic coupler 38 to the piston head 52.

The second pneumatic channel 56 can follow a circuitous path along the tool 2. For example, in the present exemplary embodiment, the second pneumatic channel 56 extends through the proximal housing block 37 to an external pneumatic coupler 57 at a distal portion thereof. From this external pneumatic coupler 57, the channel 56 extends through a pneumatic hose 59 to an additional pneumatic coupler 58 connected to a distal housing block 39. The distal housing block 39 defines a further portion of the second pneumatic channel 56 that directs the pneumatic fluid into the distal portion of the cylinder 80. The first and second pneumatic channels 54, 56 configured as described above can be employed to communicate pneumatic fluid against opposite sides of the piston head 52 to effectively drive the piston head 52, such as by "pushing" and/or "pulling" the piston head 52, along the cylinder 80 as desired.

Referring again to FIG. 6, it is to be appreciated that, in the present exemplary embodiment, as the piston head 52 is driven toward the fully retracted position PR, the piston head 52 abuts the bottom ends of the valve members 62 and pushes the valve members 62 proximally into the open position, thus providing vacuum pressure to the outer suction cup 30. When the piston head 52 is driven from the fully retracted position toward the fully extended position PE, the springs 70 bias the valve members 62 into the closed position. In this manner, the actuator 50 can effectively operate as a vacuum switch for the outer suction cup 30, providing it with vacuum pressure only when a target surface of an item is lifted to the outer suction cup 30 by the inner suction cup 32. Moreover, in this manner, the tool 2 can be configured to conserve energy otherwise wasted supplying the outer suction cup 30 with vacuum pressure when there are no items close to engagement therewith. It is to be appreciated that, at the conclusion of a pick, a positive pressure can be supplied to one or both of the outer and inner suction cups 30, 32 so as to push or "kick" the item away from the tool 2. In this manner, the tool 2 need not waste valuable time waiting for the vacuum pressure to subside sufficiently for the item to disengage from the outer and inner suction cups 30, 32 before moving to the next pick.

Each suction cup assembly 14, 16 is compliant in response to engaging an item with a force. For example, the inner suction cup assembly 16 is compliant in response to engaging an item with a force, such as the distal actuation force described above, or alternatively the force applied by the robotic arm. The outer suction cup assembly 14 is compliant in response to engaging an item with a force, such as the force applied by the robotic arm, or alternatively the proximal actuation force described above (e.g., as the inner suction cup 32 pulls the item into engagement with the outer suction cup 32). One or both of the outer and inner suction cups 30, 32 is preferably itself compliant to the shape of the item to be gripped. Each suction cup 30, 32 can be of any type, such as a bellows, a compliant or compressible or deformable ring (such as a disk or cylinder), conical or curved, or other shape. Preferably, the inner suction cup 32 is a bellows-type cup made of an elastic material, which provides the inner suction cup 32 with axial compliance. The outer suction cup 30 can comprise a ring member 82, such as a foam ring, coupled to an outer cup body 84 that is itself generally rigid and is coupled to a compliant mechanism 90 that provides the outer suction cup 30 with axial compliance.

Referring again to FIG. 8, the compliant mechanism 90 for the outer suction cup 30 will now be described for the exemplary embodiment. In this embodiment, the outer cup body 84 has a rear portion defining a proximal cup surface 85 that faces a distal surface 86 of the distal housing block 39. Preferably, a gap 87 is defined between the proximal cup surface 85 and distal housing surface 86, which gap 87 allows the outer cup body 84 to move toward the distal housing block 39 responsive to a proximal force exerted on the outer suction cup 30. The tool 2 includes at least one compliant member 88 extending from the distal housing block 39 (and thus from the housing 22) to the outer cup body 84. The at least one compliant member 88 is configured to provide axial compliance between the outer cup body 84 and the housing 22, such as the distal housing block 39, in particular, responsive to the proximal force, and return the outer cup body 84 to a neutral position once the proximal force is removed. The compliant member 88 can be a spring, which can be a coil spring extending annularly around a guide member configured to guide the compliant movement of the outer cup body 84. It is to be appreciated that the outer cup body 84 can carry a proximally extending sleeve configured to shield a portion of the tool 2, such as the distal housing block 39 and the distal portion of the cylinder, for example.

The compliant mechanism 90 for the outer suction cup 30 can also provide an indication when an item is gripped by both of the inner and outer suction cups 32, 30. For example, one or both of the outer cup body 84 and the distal housing block 39 can carry a sensor 100, such as a magnetic limit switch, by way of a non-limiting example, configured to detect axial compliance of the outer suction cup 30, particularly movement of the outer cup body 84 toward the distal housing block 39. The sensor 100 is configured to be in electrical communication with a processor 102 of a control unit 104, whereby the processor 102 interprets sensor data transmitted by the sensor 100 and controls movement of the robot arm as desired. For example, the processor 102 can be configured to interpret sensor data to associate the indication of axial compliance between the outer cup body 84 and the distal housing block 39 with the occurrence of an item engaging the outer suction cup 30, whereby the processor 102 can responsively cause the robot arm to lift the entire tool 2, with the item gripped thereby, and move the tool 2 to another location, such as for depositing the gripped item at another location, such as onto a conveyor, by way of non-limiting example. It is to be appreciated that the sensor 100 is particularly important when the robotic arm advances the tool 2 to engage an item with the inner suction cup 32 retracted, because the sensor 100 can indicate when the tool 2 is engaged with the item, which can inform the robotic arm to cease advancing the tool. In this manner, the sensor 100 can effectively operate as a "stop" switch for the system.

Figure 9:
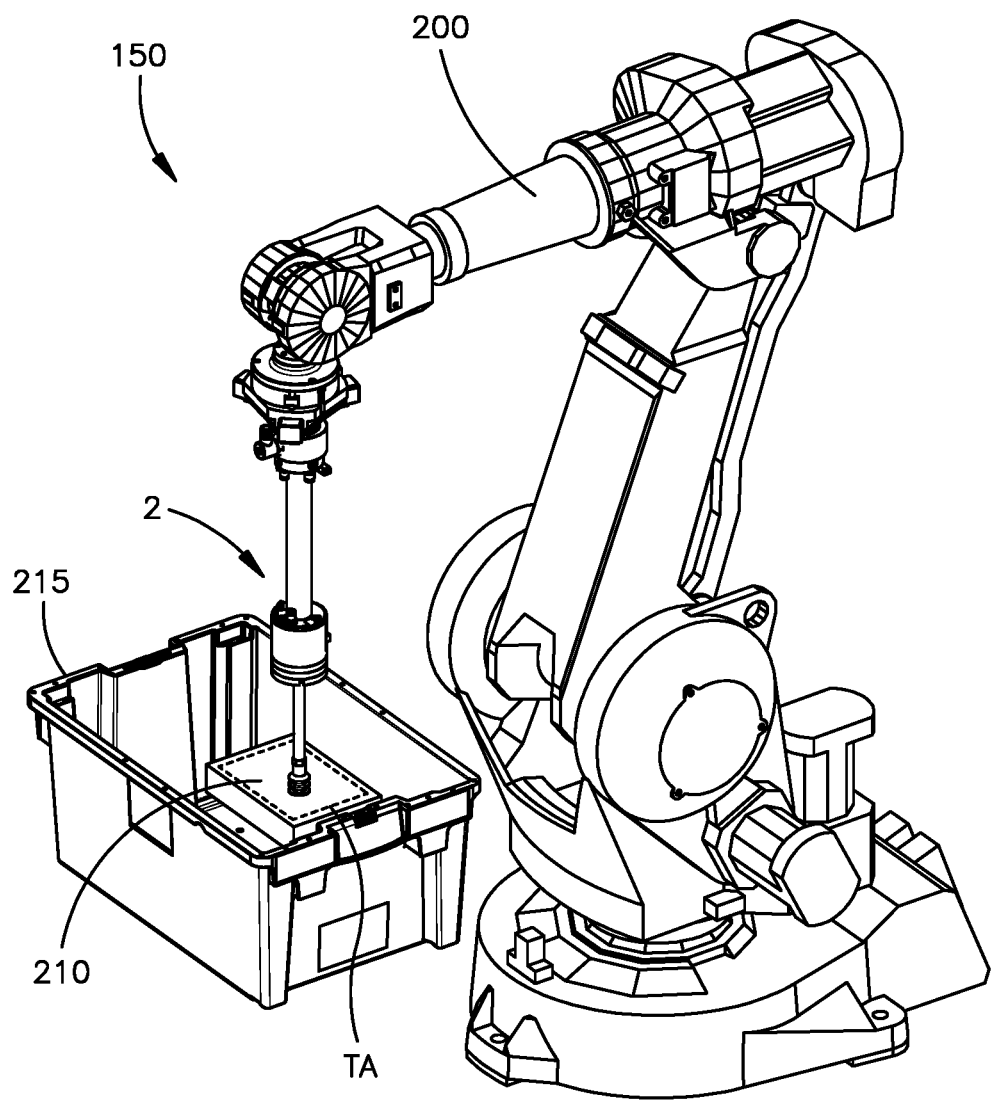
FIG. 9 shows a diagram view of a system employing an end-of-arm tool, according to another embodiment of the present disclosure.

An example method of employing the end-of-arm tool 2 in a system 150 for moving, "picking", lifting, and/or sorting various items 210 will now be described with reference to FIG. 9. The example method includes: manipulating a robotic arm 200 carrying an end-of-arm tool 2 so as to position the tool 2 at a first position proximate an item 210 (which can be located in a tote 215, for example); identifying a target area TA of the item 210; extending a lower suction tube 40 outwardly from a housing 22 of the tool 2 until an inner suction cup 32 disposed at a distal end 42 of the lower suction tube 44 engages the target area; communicating vacuum pressure to the inner suction cup 32, thereby gripping the item with the inner suction cup 32; moving the lower suction tube 40 within the housing 22 until the target area TA is further engaged by an outer suction cup 30 at a distal end 86 of the housing 22, wherein the inner and outer suction cups 30, 32 are concentric with each other; and communicating vacuum pressure to the outer suction cup 30, thereby further gripping the item with the outer suction cup 30. It is to be appreciated that the foregoing step of moving the lower suction tube 40 within the housing 22 can include one or both of retracting the lower suction tube 40 within the housing 22 or advancing the housing 22 along the lower suction tube 40. It is also to be appreciated that the step of communicating vacuum pressure to the outer suction cup 30

The example method can further include sensing, via an automated sensor 100 in electronic communication with a processor 102, when the target area TA engages the outer suction cup 30; and transmitting sensor data to the processor 102, wherein the sensor data indicates that the target area TA has engaged the outer suction cup 30

The example method can further include transmitting a command signal from an electronic control unit 104 in electronic communication with the processor 102 to the robotic arm 200; and manipulating the robotic arm 200, responsive to the command signal, so as to position the tool 2 (while it grips the item) to a second position remote from the first position.

The example method can also include interrupting vacuum pressure to the inner and outer suction cups 32, 30, thereby disengaging the inner and outer suction cups 32, 30 from the item. Optionally, a positive pressure can be communicated to one or both of the outer and inner suction cups 30, 32 so as to "push" the item away from the tool 2, resulting in a faster disengagement.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A suction cup tool for the end of a robotic arm, the suction cup tool comprising:
  a housing;
  an outer suction cup assembly that includes an outer suction cup at a distal end of the housing, wherein the outer suction cup is configured to apply a first vacuum gripping force;
  an inner suction cup assembly that extends centrally through the outer suction cup assembly, the inner suction cup assembly comprising:
    a lower suction tube;
    an inner suction cup at a distal end of the lower suction tube and concentrically located relative to the outer suction cup, wherein the inner suction cup is configured to apply a second vacuum gripping force; and
    an actuator configured to selectively 1) extend the lower suction tube with respect to the outer suction cup so as to engage a target surface of at least one item with the inner suction cup, and 2) retract the lower suction tube with respect to the outer suction cup so as to engage the target surface with the outer suction cup and the inner suction cup concurrently; and
  at least one vacuum source, wherein the at least one vacuum source is configured to communicate vacuum pressure concurrently to the inner and outer suction cups for applying the first and second vacuum gripping forces concurrently to the target surface.

2. The suction cup tool of claim 1, wherein the lower suction tube defines a central axis, the inner suction cup defines a distal end, the outer suction cup defines a distal end, and the lower suction tube is configured to extend and retract with respect to the outer suction cup along the central axis between a fully retracted position and a fully extended position such that, in the fully retracted position, the distal end of the inner suction cup does not protrude distally beyond the distal end of the outer suction cup.

3. The suction cup tool of claim 2, wherein the outer suction cup and the inner suction cup are both configured to be in communication with the at least one vacuum source, wherein the at least one vacuum source is configured to communicate vacuum pressure to the distal ends of the inner and outer suction cups for gripping the target surface.

4. The suction cup tool of claim 3, wherein the inner suction cup is configured to 1) grip the target surface in the fully extended position, 2) lift the at least one item, during retraction of the lower suction tube, toward the distal end of the outer suction cup, and 3) grip the target surface concurrently with the outer suction cup when in the fully retracted position.

5. An end-of-arm tool for the end of a robotic arm, the end-of-arm tool comprising:
  a housing;
  an outer suction cup assembly that includes an outer suction cup at a distal end of the housing;
  at least one compliant member extending from the housing to the outer suction cup, wherein the at least one compliant member is configured to provide axial compliance between the outer suction cup and the housing responsive to a proximal force exerted on the outer suction cup; and
  an inner suction cup assembly that extends centrally through the outer suction cup assembly, the inner suction cup assembly comprising:
    a lower suction tube;
    an inner suction cup at a distal end of the lower suction tube and in fluid communication with the lower suction tube, wherein the inner suction cup is concentrically located relative to the outer suction cup; and
    an actuator configured to selectively extend and retract the lower suction tube with respect to the outer suction cup.

6. The end-of-arm tool of claim 5, wherein the inner suction cup assembly further comprises an inner suction tube in fluid communication with the lower suction tube, wherein the lower suction tube is configured to telescopically translate with respect to the inner suction tube along a central axis.

7. The end-of-arm tool of claim 6, further comprising:
  a central plenum configured to communicate vacuum pressure from a vacuum source to the inner suction tube, wherein the inner suction tube communicates the vacuum pressure to the lower suction tube; and
  at least one outer plenum configured to communicate vacuum pressure to the outer suction cup.

8. The end-of-arm tool of claim 7, wherein the vacuum source is a first vacuum source, and the at least one outer plenum is configured to communicate vacuum pressure from a second vacuum source to the outer suction cup.

9. The end-of-arm tool of claim 7, further comprising a manifold coupled to the housing, wherein the manifold includes an external port configured to be in fluid communication with the vacuum source, and the manifold defines an interior space in fluid communication with the external port and with the central plenum for communicating the vacuum pressure to the lower suction tube.

10. The end-of-arm tool of claim 9, wherein the manifold extends circumferentially around the housing, the manifold defines an internal annular space, and the manifold is rotationally coupled to the housing in a manner sealing the internal annular space, whereby the manifold defines a rotary vacuum joint.

11. The end-of-arm tool of claim 7, wherein the actuator comprises a drive member configured to drive translation of the lower suction tube with respect to the inner suction tube responsive to one or more actuation forces transmitted to the drive member.

12. The end-of-arm tool of claim 11, wherein the at least one outer plenum defines at least one inlet in fluid communication with the central plenum, and the tool further comprising at least one valve member configured to move between 1) an open position in which the at least one inlet is open to the central plenum and the at least one outer plenum, and 2) a closed position in which the at least one valve member occludes the at least one inlet so as to inhibit fluid communication between the central plenum and the at least one outer plenum.

13. The end-of-arm tool of claim 12, wherein the drive member is further configured to move the at least one valve member between one of the open and closed positions to the other of the open and closed positions.

14. The end-of-arm tool of claim 11, wherein:
the drive member comprises a piston head rigidly coupled to the lower suction tube;
the actuator further comprises first and second actuation channels each extending within the end-of-arm tool and in pneumatic communication with the piston head, wherein,
the first actuation channel is configured to direct pneumatic fluid against the piston head so as to apply a first actuation force of the one or more actuation forces to the piston head, thereby driving the piston head distally along the central axis so as to extend the lower suction tube with respect to the outer suction cup, and
the second actuation channel is configured to direct pneumatic fluid against the piston head so as to apply a second actuation force of the one or more actuation forces to the piston head, thereby driving the piston head proximally along the central axis so as to retract the lower suction tube with respect to the outer suction cup.

15. The end-of-arm tool of claim 5, wherein the housing comprises a distal portion having a distal surface, and the outer suction cup comprises an outer suction cup body defining a proximal surface spaced from the distal surface by a gap, wherein the at least one compliant member is configured to 1) allow reduction of the gap from a neutral gap distance to a compressed gap distance responsive to the proximal force, and 2) bias the outer suction cup body distally so as to return the gap to the neutral gap distance when the proximal force is removed.

16. A method of lifting various items with a robotic arm carrying an end-of-arm tool, the method comprising:
manipulating the robotic arm so as to position the end-of-arm tool at a first position proximate an item;
identifying a target area of the item;
advancing one or both of an outer suction cup and an inner suction cup of the end-of arm-tool into engagement with the target area, wherein the outer suction cup is located at a distal end of a housing of the end-of arm-tool, and the inner suction cup and the outer suction cup are concentric with each other;
communicating vacuum pressure to the inner suction cup, thereby gripping the item with the inner suction cup; and
communicating vacuum pressure to the outer suction cup concurrently while communicating vacuum pressure to the inner suction cup, thereby further gripping the item with the outer suction cup.

17. The method of claim 16, further comprising:
sensing, via an automated sensor in electronic communication with a processor, when the target area engages the outer suction cup; and;
transmitting data to the processor, wherein the data indicates that the target area has engaged the outer suction cup.

18. The method of claim 17, further comprising:
transmitting a command signal from an electronic control unit in electronic communication with the processor to the robotic arm; and
manipulating the robotic arm, responsive to the command signal, so as to position the end-of-arm tool, while gripping the item, to a second position remote from the first position.

* * * * *